United States Patent Office 2,849,495
Patented Aug. 26, 1958

2,849,495

PREPARATION OF 3,4-DEHYDRO-β-CAROTENE

Otto Isler, Basel, Herbert Lindlar, Reinach, Basel, Marc Montavon and Rudolf Rüegg, Basel, and Paul Zeller, Neuallschwil, Switzerland, assignors to Hoffmann-La Roche Inc., Nutley, N. J., a corporation of New Jersey No Drawing. Application December 15, 1955
Serial No. 553,218

Claims priority, application Switzerland
December 24, 1954

11 Claims. (Cl. 260—617)

This invention relates to novel chemical syntheses, and to novel chemical compounds useful as intermediates therein. More comprehensively, the invention relates to a novel method of preparing all-trans-3,4-dehydro-β-carotene. [In those nomenclatures employed in the instant disclosure wherein $C_{40}$-carotenoid compounds are named on the basis of carotene as a reference structure, the numbers are applied to the forty carbon atoms of the fundamental carotene carbon skeleton according to the numbering system shown in Liebigs Annalen der Chemie, volume 573, page 3 (1951), as a model.]

In one briefly described aspect, the invention provides a process of making all-trans-3,4-dehydro-β-carotene which comprises condensing acetylene through one of its reactive hydrogen atoms with 8-(2,6,6-trimethyl-1,3-cyclohexadien-1-yl)-2,6-dimethyl - 2,4,6 - octatrien-1-al and through the other of its reactive hydrogen atoms with 8-(2,6,6-trimethyl-1-cyclohexen-1-yl)-2,6-dimethyl - 2,4,6-octatrien-1-al, by means of metal-organic reactions, thereby producing 1-(2,6,6 - trimethyl-1,3-cyclohexadien-1-yl)-18-(2,6,6-trimethyl - 1 - cyclohexen-1-yl)-3,7,12,16-tetramethyl - 8,11 - dihydroxy - 2,4,6,12,14,16 - octadecahexaen-9-yne; subjecting the latter to bilateral allyl rearrangement-dehydration thereby producing 3,4-15,15'-bisdehydro-β-carotene; partially hydrogenating the latter at the triple bond thereby producing 3,4-dehydro-15,15'-mono-cis-β-carotene; and isomerizing the latter thereby producing all-trans-3,4-dehydro-β-carotene.

In the first stage of a detailed procedure taught by the invention, 8-(2,6,6-trimethyl - 1,3 - cyclohexadien-1-yl)-2,6-dimethyl-2,4,6-octatrien-1-al [or 8-(2,6,6-trimethyl-1-cyclohexen-1-yl)-2,6-dimethyl - 2,4,6 - octatrien - 1 - al] is advantageously reacted with an alkali metal acetylide or an alkaline earth metal acetylide in liquid ammonia; and the condensation product formed, suitably after hydrolysis to 10-2,6,6-trimethyl - 1,3 - cyclohexadien-1-yl)-4,8-dimethyl - 4,6,8 - decatrien-1-yn-3-ol [or respectively, 10-(2,6,6-trimethyl - 1 - cyclohexen-1-yl)-4,8-dimethyl-4,6,8-decatrien-1-yn-3-ol] is condensed with 8-(2,6,6-trimethyl-1 - cyclohexen-1-yl)-2,6-dimethyl-2,4,6-octatrien-1-al [or respectively, 8-(2,6,6-trimethyl - 1,3 - cyclohexadien-1-yl)-2,6-dimethyl-2,4,6-octatrien-1-al] by means of a metal-organic reaction.

The condensation of the initial aldehyde reactant with the acetylide in liquid ammonia can be effected either at elevated pressures and room temperature, or under normal pressures at the boiling temperature of the ammonia. The alkali metal acetylide, e. g. sodium acetylide or lithium acetylide, or the alkaline earth metal acetylide, e. g. calcium acetylide, can conveniently be prepared from acetylene and an alkali metal or, respectively, an alkaline earth metal, before the condensation reaction; in the same vessel and in the same liquid ammonia medium which it is intended to use for the condensation. Preferably, lithium acetylide is used for this initial condensation. The initial aldehyde reactant is advantageously dissolved in an inert solvent, e. g. diethyl ether, before being introduced into the liquid ammonia reaction medium. The hydrolysis of the condensation product can be effected, for example, by adding an ammonium salt to the liquid ammonia medium, or by removing the ammonia and then treating the residue with a dilute aqueous solution of an acid.

The condensation of the intermediate carbinol product 10 - (2,6,6 - trimethyl - 1,3 - cyclohexadien-1-yl)-4,8-dimethyl - 4,6,8 - decatrien-1-yn-3-ol [or, respectively, 10-(2,6,6-trimethyl - 1 - cyclohexen-1-yl)-4,8-dimethyl-4,6,8-decatrien-1-yn-3-ol] with the second aldehyde reactant, 8-(2,6,6-trimethyl-1-cyclohexen - 1 - yl) - 2,6 - dimethyl-2,4,6-octatrien-1-al [or, respectively, 8-(2,6,6-trimethyl-1,3 - cyclohexadien-1-yl)-2,6-dimethyl - 2,4,6 - octatrien-1-al] is also effected by means of a metal-organic reaction. For example, two molar proportions of a lower alkyl magnesium halide or two molar proportions of lithium phenyl, dissolved in an inert solvent, e. g. diethyl ether, are allowed to react with the carbinol reactant, preferably dissolved in the same inert solvent. The first mol of the organometal compound reacts with the hydroxyl group of the carbinol, whereas the second mol of the organometal compound reacts with the hydrogen of the acetylenic linkage and renders the terminal carbon atom of the carbinol reactive in the following step of condensation. The dimagnesium halide compound of the carbinol or the dilithium compound of the carbinol is advantageously reacted in the same solvent in which produced with a molar proportion of the second aldehyde reactant. Preferably, 10-(2,6,6-trimethyl - 1,3 - cyclohexadien-1-yl)-4,8-dimethyl-4,6,8-decatrien-1-yn-3-ol [or, respectively, 10-(2,6,6-trimethyl - 1 - cyclohexen-1-yl)-4,8-dimethyl-4,6,8-decatrien-1-yn-3-ol] is reacted in an inert solvent, such as diethyl ether, with about two molar proportions of a lower alkyl magnesium halide such as ethyl magnesium bromide or methyl magnesium chloride, and the dimagnesium halide compound obtained, without isolation or purification thereof, is reacted with a molar proportion of 8-(2,6,6-trimethyl - 1 - cyclohexen-1-yl)-2,6-dimethyl-2,4,6-octatrien-1-al [or respectively, 8-(2,6,6-trimethyl-1,3-cyclohexadien-1-yl)-2,6-dimethyl - 2,4,6 - octatrien-1-al]. The condensation product, best without further purification, is hydrolyzed by conventional expedients, for example by pouring the reaction mixture containing it into a mixture of ice and dilute sulfuric acid, thereby forming 1-(2,6,6-trimethyl-1,3-cyclohexadien-1-yl) - 18 - (2,6,6-trimethyl - 1 - cyclohexen-1-yl)-3,7,12,16-tetramethyl-8,11-dihydroxy-2,4,6,12,14,16-octadecahexaen-9-yne.

In the second stage of said detailed procedure according to the present invention, 1-(2,6,6-trimethyl-1,3-cyclohexadien - 1 - yl)-18-(2,6,6-trimethyl-1-cyclohexen-1-yl)-3,7,12,16 - tetramethyl - 8,11 - dihydroxy-2,4,6,12,14,16-octadecahexaen-9-yne is subjected to bilateral dehydration, with accompanying allyl rearrangement. In this reaction the hydroxyl groups, if desired after esterification, migrate by a triple allyl shift toward the nearer ring, and split out two molar proportions of water (or acid, as the case may be) by combining with a hydrogen atom from the methylene group adjacent said ring. Thereby two new double bonds are formed, and simultaneously all of the multiple bonds are arranged into a conjugated system. The allyl rearrangement and dehydration reactions can be effected simultaneously by heating the 8,11-diol to 90°–100° C. with an equivalent quantity of phosphorus oxychloride or pyridine hydrochloride in the presence of an excess of pyridine, in an inert solvent such as petroleum ether; or by refluxing with a strong organic acid, such as p-toluenesulfonic acid, in toluene. In a preferred mode of execution 1-(2,6,6-trimethyl-1,3-cyclohexadien - 1 - yl) - 18-(2,6,6-trimethyl-1-cyclohexen-1-yl) - 3,7,12,16-tetramethyl-8,11-dihydroxy-2,4,6,12,14,16-octadecahexaen-9-yne is reacted with hydrogen halide in an inert solvent; preferably said 8,11-diol is reacted with concentrated aqueous hydrohalic acid in a halogenated hydrocarbon having a large dipole moment (e. g., in the range between about $1.18 \times 10^{-18}$ e. s. u. $\times$ cm. and $1.74 \times 10^{-18}$ e. s. u. $\times$ cm.), at a temperature below about 0° C.; thereby forming 1-(2,6,6-trimethyl-1,3-cyclohexadien - 1 - yl) - 18 - (2,6,6-trimethyl-1-cyclohexen-1-yl)-3,7,12,16 - tetramethyl - 2,17 - dihalo-3,5,7,11,13,15-octadecahexaen-9-yne; and then the latter is treated with water or a basic compound, preferably the former, to split off two molar proportions of hydrogen halide. Preferred as solvents of large dipole moment are methylene chloride or chloroform. Suitable hydrohalic acids are, for example, commercial concentrated aqueous hydrochloric acid or commercial concentrated aqueous hydrobromic acid. The 3,4,15,15'-bisdehydro-$\beta$-carotene so formed can be purified by recrystallization.

In the third stage of said detailed procedure according to the present invention, 3,4,15,15'-bisdehydro-$\beta$-carotene is partially hydrogenated catalytically at the triple bond. The partial hydrogenation can be accomplished according to methods known per se, e. g. by reaction with elemental hydrogen in the presence of a selective hydrogenation catalyst, in an organic solvent. A suitable selective hydrogenation catalyst is a palladium-on-calcium carbonate catalyst partially deactivated with lead and quinoline. An especially advantageous mode of execution of this third stage comprises effecting the hydrogenation in a hydrocarbon medium in which the 3,4,15,15'-bisdehydro-$\beta$-carotene is only partially soluble. In this manner, the bisdehydro compound subjected to hydrogenation slowly goes into solution as the hydrogenation proceeds, the hydrogenation product being precipitated from the hydrogenation mixture as it is formed. The 3,4-dehydro-15,15'-mono-cis-$\beta$-carotene so obtained has a characteristic "cis peak" in the ultraviolet absorption spectrum. Isolation of the hydrogenation product is not mandatory. The subsequent stage of isomerization (described immediately below) can be effected directly upon the suspension of the 3,4-dehydro-15,15'-mono-cis-$\beta$-carotene.

In the last stage of said detailed procedure according to the present invention, the 3,4-dehydro-15,15'-mono-cis-$\beta$-carotene is isomerized to the corresponding all-trans compound. This isomerization can be effected, for example, by treatment with iodine, by irradiation, or by heating. A particularly advantageous mode of execution comprises heating a suspension of 3,4-dehydro-15,15'-mono-cis-$\beta$-carotene for several hours at 80°–100° C., in a quantity of an organic liquid vehicle insufficient for the complete solution of the mono-cis material. As the isomerization progresses, the mono-cis compound goes into solution and simultaneously the all-trans - 3,4 - dehydro - $\beta$ - carotene formed crystallizes out, so that an almost quantitative isomerization can be attained. The product so synthesized according to the invention can be purified by crystallization, by partition between solvents, or by chromatography. It can be stabilized, when necessary, by the addition of antioxidants, which latter can also be employed during the execution of the processes of the invention.

As will be seen from the foregoing, in one preferred embodiment the invention provides a process for the preparation of all-trans-3,4-dehydro-$\beta$-carotene which comprises condensing acetylene with approximately one molar proportion of 8-(2,6,6-trimethyl-1,3-cyclohexadien-1-yl)-2,6-dimethyl-2,4,6-octatrien-1-al by a metal-organic reaction thereby forming 10-(2,6,6-trimethyl-1,3-cyclohexadien - 1-yl)-4,8-dimethyl-4,6,8-decatrien-1-yn-3-ol; condensing the latter with approximately one molar proportion of 8-(2,6,6-trimethyl-1-cyclohexen-1-yl)-2,6-dimethyl-2,4,6-octatrien-1-al thereby forming 1-(2,6,6-trimethyl - 1,3 - cyclohexadien-1-yl)-18-(2,6,6-trimethyl-1-cyclohexen - 1-yl)-3,7,12,16-tetramethyl-8,11-dihydroxy-2,4,6,12,14,16-octadecahexaen-9-yne; reacting the latter with hydrogen halide selected from the group consisting of hydrogen chloride and hydrogen bromide, thereby forming the corresponding 1-(2,6,6-trimethyl-1,3-cyclohexadien - 1 - yl)-18-(2,6,6-trimethyl-1-cyclohexen-1-yl)-3,7,12,16 - tetramethyl - 2,17 - dihalo-3,5,7,11,13,15-octadecahexaen-9-yne, and dehydrohalogenating the latter, thereby forming 3,4,15,15'-bisdehydro-$\beta$-carotene; partially hydrogenating the latter at the triple bond thereby forming 3,4 - dehydro - 15,15' - mono-cis-$\beta$-carotene; and isomerizing the latter thereby forming all-trans-3,4-dehydro-$\beta$-carotene.

In another preferred embodiment, the invention provides an alternative process for the preparation of 3,4-dehydro-$\beta$-carotene which comprises condensing acetylene with approximately one molar proportion of 8-(2,6,6 - trimethyl - 1-cyclohexen-1-yl)-2,6-dimethyl-2,4,6-octatrien-1-al by a metal-organic reaction thereby forming 10 - (2,6,6-trimethyl-1-cyclohexen-1-yl)-4,8-dimethyl-4,6,8-decatrien-1-yn-3-ol, condensing the latter with approximately one molar proportion of 8-(2,6,6-trimethyl-1,3 - cyclohexadien - 1-yl)-2,6-dimethyl-2,4,6-octatrien-1-al thereby forming 1-(2,6,6-trimethyl-1,3-cyclohexadien-1 - yl) - 18-(2,6,6-trimethyl-1-cyclohexen-1-yl)-3,7,12,16-tetramethyl - 8,11 - dihydroxy - 2,4,6,12,14,16 - octadecahexaen-9-yne; reacting the latter with hydrogen halide selected from the group consisting of hydrogen chloride and hydrogen bromide, thereby forming the corresponding 1 - (2,6,6-trimethyl-1,3-cyclohexadien-1-yl)-18-(2,6,6-trimethyl - 1-cyclohexen-1-yl)-3,7,12,16-tetramethyl-2,17-dihalo-3,5,7,9,13,15-octadecahexaen-9-yne, and dehydrohalogenating the latter, thereby forming 3,4,15,15'-bisdehydro-$\beta$-carotene; partially hydrogenating the latter at the triple bond thereby forming 3,4-dehydro-15,15'-mono-cis-$\beta$-carotene; and isomerizing the latter thereby forming all-trans-3,4-dehydro-$\beta$-carotene.

The product all-trans-3,4-dehydro-$\beta$-carotene synthesized according to the invention is useful as a coloring agent for food-stuffs, e. g., butter, cheese and margarine, and for feedstuffs. Inasmuch as synthetic all-trans-3,4-dehydro-$\beta$-carotene produced according to the invention also possesses the biological activity characteristic of vitamin A, it imparts this acivity, as well as its characteristic orange-red color to the nutrient materials in which it is incorporated, for example oil, fat, butter, cheese, margarine, ice cream powder, shortenings and others.

The invention is further disclosed in the following examples which are illustrative but not limitative thereof:

*Example 1*

30 g. of 4-(2,6,6-trimethyl-1-cyclohexen-1-yl)-2-methyl-2-buten-1-al in 210 g. of methylene chloride, together with 13.5 g. of sodium bicarbonate and 9 g. of calcium oxide, was cooled to 0° C., while stirring. Then 28 g. of N-bromosuccinimide was added, and the temperature was maintained for 3 hours at 5° to 10° C. by intermittent cooling. After some time the mixture assumed a yellow to red color and then slowly became colorless again. It was filtered, 30 g. of quinoline was added, and the methylene chloride was removed in vacuo. Again 30 g. of quinoline was added, and the mixture was warmed for 2 hours under nitrogen on a steam bath. 350 g. of petroleum ether (B. P. 30° to 60° C.) was added, and then the mixture was poured into a mixture of ice with 250 g. of 3N sulfuric acid, while stirring. The insoluble resin was filtered off and the aqueous layer was also removed; the residual petroleum-ether solution was washed with water, dilute aqueous sodium bicarbonate solution and then with water again. The washed petroleum ether solution was dried over sodium sulfate and concentrated, yielding 29.4 g. of crude 4-(2,6,6-trimethyl-2-cyclohexen-1-ylidene)-2-methyl-2-buten-1-al; this product was purified by distillation from a Hickman flask in a high vacuum; B. P. 90° C./0.03 mm. Hg.

*Example 2*

136 g. of 4-(2,6,6-trimethyl-2-cyclohexen-1-ylidene)-2- methyl-2-buten-1-al was heated with 97 ml. of isopropenyl acetate and 0.7 g. of p-toluenesulfonic acid for 3 to 4 hours at 100° to 140° C., while passing through a slow stream of nitrogen, the acetone released being thus continuously distilled out of the reaction mixture. Then the reaction mixture was allowed to cool. The reaction mixture, containing crude 4-(2,6,6-trimethyl-1,3-cyclohexadien-1-yl)-2-methyl-1-acetoxy-1,3-butadiene, was directly subjected to hydrolysis, by adding thereto 650 ml. of methanol, 65 ml. of water and 46 g. of sodium bicarbonate, and refluxing the mixture for 12 hours while stirring. The reaction mixture was then poured into 2000 ml. of ice water, and the resulting mixture was made slightly acidic with dilute sulfuric acid. The reaction product was extracted with petroleum ether, the extract was washed with aqueous sodium bicarbonate solution and dried over sodium sulfate. The solvent was evaporated and the residue was distilled in a high vacuum. There was obtained 98 g. of 4-(2,6,6-trimethyl-1,3-cyclohexadien-1-yl) - 2 - methyl-2-buten-1-al; B. P.=80° C./0.05 mm. Hg; $n_D^{22}$=1.530; U. V. maxima at 224 m$\mu$ and 268 m$\mu$; $E_1^1$=795 and 345 (in petroleum ether solution).

*Example 3*

A solution of 82 g. of 4-(2,6,6-trimethyl-1,3-cyclohexadien-1-yl)-2-methyl-2-buten-1-al in 90 ml. of ethyl orthoformate was mixed with a solution of 1.5 ml. of orthophosphoric acid in 15 ml. of absolute ethanol, and the mixture was allowed to stand for 15 hours at 20° to 25° C. Then 10 ml. of pyridine was added and the mixture was poured into a mixture of 100 g. of 5% aqueous sodium bicarbonate solution and 60 g. of ice. The reaction product was extracted with petroleum ether, the extract was shaken with aqueous sodium bicarbonate solution and dried over potassium carbonate. The solution was concentrated, and the residue was freed in vacuo at 70° C. from excess ethyl orthoformate, and ethyl formate produced by reaction. The residue, 108 g. of crude 4-(2,6,6-trimethyl-1,3-cyclohexadien-1-yl)-2-methyl - 1,1 - diethoxy-2-butene, had $n_D^{25}$=1.487; absorption maximum in the ultraviolet spectrum at 266 m$\mu$ (in petroleum ether solution). It was used without further purification for the next step.

To the above 108 g. of material was added 3 ml. of a 10% by weight solution of zinc chloride in ethyl acetate; then 29 g. of ethyl vinyl ether and 27 ml. of the same 10% solution of zinc chloride in ethyl acetate were added simultaneously, with stirring, at 30° to 35° C., over a period of about 2 hours; stirring was continued 20 hours longer at room temperature. The crude 6-(2,6,6-trimethyl-1,3-cyclohexadien-1-yl)-4-methyl - 1,1,3 - triethoxy-4-hexene obtained in this manner was added to a mixture of 300 ml. of glacial acetic acid, 15 g. of sodium acetate and 10 ml. of water, and the reaction mixture was heated at 95° C. for 6 hours in a nitrogen atmosphere. The reaction mixture was cooled to 30°–40° C., and poured into a mixture of 200 g. of ice and 200 ml. of water. The resulting mixture was extracted with petroleum ether, the extract was washed with 5% aqueous sodium bicarbonate solution and then with water, and dried over sodium sulfate. The petroleum ether solution was concentrated and the residue was distilled in a high vacuum. There was thus obtained 65 g. of 6-(2,6,6-trimethyl-1,3-cyclohexadien-1-yl)-4-methyl-2,4-hexadien-1-al, B. P.= about 105° C./0.05 mm. Hg. This material was recrystallized twice from petroleum ether at minus 70° C., yielding yellowish crystals of M. P. 18° to 22° C.; ultraviolet absorption maximum at 274 m$\mu$, $E_1^1$=1380 (in petroleum ether solution).

*Example 4*

A solution of 38.5 g. of 6-(2,6,6-trimethyl-1,3-cyclohexadien-1-yl)-4-methyl-2,4-hexadien-1-al in 40 ml. of ethyl orthoformate was mixed with a solution of 0.6 ml. of orthophosphoric acid in 9 ml. of absolute ethanol, and the reaction mixture was allowed to stand for 15 hours at 20° to 25° C. Then 6 ml. of pyridine was added, and the mixture was poured into a mixture of 50 g. of 5% aqueous sodium bicarbonate solution and 30 g. of ice. The product was extracted from the resulting mixture with petroleum ether, the petroleum ether extract was shaken with aqueous sodium bicarbonate solution and dried over potassium carbonate. The petroleum ether solution was concentrated, and the residue was liberated in vacuo at 70° C. from excess ethyl orthoformate and ethyl formate produced by reaction, yielding 49 g. of 6-(2,6,6-trimethyl-1,3-cyclohexadien-1-yl)-4-methyl - 1,1-diethoxy-2,4-hexadiene, $n_D^{26}$=1.510, U. V. absorption maxima at 235 m$\mu$ and 264 m$\mu$ (in petroleum ether solution). This material was used for subsequent processing without further purification.

The above 49 g. of material was mixed with 2 ml. of a 10% by weight solution of zinc chloride in ethyl acetate. Then, 14 g. of ethyl propenyl ether and 14 ml. of the same 10% solution of zinc chloride in ethyl acetate were added simultaneously, with stirring, at 20° to 35° C., over a period of 2 hours. The reaction mixture was stirred further for 15 hours at room temperature. Then the reaction mixture was extracted with petroleum ether, the extract was washed with dilute aqueous NaOH solution and dried over potassium carbonate. The solvent was distilled off, yielding 55 g. of crude 8-(2,6,6-trimethyl-1,3-cyclohexadien-1-yl) - 2,6-dimethyl-1,1,3-triethoxy-4,6-octadiene, $n_D^{22}$=1.501, U. V. absorption maxima at 236 m$\mu$ and 262 m$\mu$ (in petroleum ether solution). This material was processed without further purification.

The above 55 g. of material was mixed with 120 ml. of glacial acetic acid, 10 g. of sodium acetate and 6 ml. of water. A trace of hydroquinone was added, and the reaction mixture was heated at 95° C. for 6 hours. The mixture was then cooled to 30° to 40° C. and poured into a mixture of 100 g. of ice and 100 ml. of water. The reaction product was extracted with petroleum ether, the petroleum ether extract was washed with aqueous sodium bicarbonate solution and then with water, and dried over sodium sulfate. The petroleum ether solution was concentrated, and the residue was distilled in a high vacuum, yielding 30 g. of 8-(2,6,6-trimethyl-1,3-cyclohexadien-1-yl)-2,6-dimethyl-2,4,6-octatrien-1-al, B. P. =138° to 143° C./0.08 mm. Hg; which soon solidified into a crystalline mass. The material was recrystallized twice from twice its weight of petroleum ether at minus 70° C., yielding yellow crystals of M. P. 64° to 66° C., U. V. absorption maximum at 315 m$\mu$, $E_1^1$=1745 (in petroleum ether solution).

*Example 5*

Dry, acetone-free acetylene was introduced into a solution of 3 g. of lithium in 1200 ml. of liquid ammonia, until there was no further reaction. Then, while stirring vigorously, a solution of 100 g. of 8-(2,6,6-trimethyl-1,3-cyclohexadien-1-yl) - 2,6 - dimethyl-2,4,6-octatrien-1-al in 400 ml. of absolute diethyl ether was added over a period of 20 minutes, and the reaction mixture was stirred thoroughly for 20 hours, with precautions to exclude moisture. Thereupon 50 g. of ammonium chloride was added in small portions, and the ammonia was permitted to evaporate. 400 ml. of water was added, the ether layer was separated and washed with water, then dried over sodium sulfate and concentrated. The residual reddish oil was dried well in vacuo. There was obtained 108 g. of 10-(2,6,6-trimethyl-1,3-cyclohexadien-1-yl)-4,8-dimethyl-4,6,8-decatrien-1-yn-3-ol as a viscous oil, having an absorption maximum in the ultraviolet spectrum at 284 m$\mu$ (in petroleum ether). Determination of active hydrogen according to Zerewitinoff showed, in the cold, one active hydrogen atom; and in the warm, two active hydrogen atoms.

The latter material (108 g.) was dissolved in 500 ml. of absolute diethyl ether and was added gradually, at 15°–20° C., while stirring, to a Grignard solution prepared from 18 g. of magnesium, 91 g. of ethyl bromide and 300 ml. of absolute diethyl ether. The reaction mixture was refluxed for one hour in a nitrogen atmosphere, then cooled with ice water. A solution of 92 g. of 8-(2,6,6 - trimethyl - 1 - cyclohexen - 1 - yl) - 2,6 - dimethyl-2,4,6-octatrien-1-al in 400 ml. of absolute diethyl ether was added, at about 20° C., and the reaction mixture was refluxed for 3 to 4 hours in a nitrogen atmosphere. The reaction mixture was then poured into a mixture of 400 ml. of 3 N sulfuric acid and 600 g. of ice, the ether layer was separated and washed with 5% aqueous sodium bicarbonate solution, dried over sodium sulfate and concentrated in vacuo, yielding 200 g. of resinous 1-(2,6,6-trimethyl - 1,3 - cyclohexadien - 1 - yl) - 18 - (2,6,6-trimethyl - 1 - cyclohexen - 1 - yl) - 3,7,12,16-tetramethyl-8,11-dihydroxy-2,4,6,12,14,16-octadecahexaen-9-yne; absorption maximum in the ultraviolet spectrum at 282.5 m$\mu$ (in petroleum ether).

*Example 6*

23 g. of 1-(2,6,6-trimethyl-1,3-cyclohexadien-1-yl)-18-(2,6,6 - trimethyl - 1 - cyclohexen - 1 - yl) - 3,7,12,16-tetramethyl - 8,11 - dihydroxy - 2,4,6,12,14,16-octadecahexaen-9-yne was dissolved in 2000 ml. of methylene chloride and was cooled to minus 40° C. by addition of solid carbon dioxide. 70 ml. of glacial acetic acid was added, and within a period of 30 seconds the reaction mixture was mixed with 80 ml. of concentrated aqueous hydrobromic acid containing 57% by weight HBr. The mixture was stirred for a further period of 90 seconds at minus 35° C. Then, as quickly as possible, 2000 ml. of water was added to the reaction mixture, containing in solution 1 - (2,6,6 - trimethyl - 1,3 - cyclohexadien - 1-yl) - 18-(2,6,6-trimethyl - 1,3 - cyclohen - 1 - yl) - 3,7-12,16 - tetramethyl - 2,17 - dibromo - 3,5,7,11,13,15-octadecahexaen-9-yne, and the whole was stirred vigorously for 3 hours at a temperature of 0° to 5° C. Then the methylene chloride solution was separated, washed neutral with water, dried over sodium sulfate and the solvent was driven off. The crystalline residue was shaken well with a little petroleum ether and the crystal slurry was filtered. Upon recrystallization of the solid from a mixture of methylene chloride and methanol, 3,4-15,15'-bisdehydro-$\beta$-carotene was obtained as dark red to violet crystals, M. P. 158°–160° C.; U. V. max. at 439 m$\mu$ (in petroleum ether solution).

*Example 7*

2 g. of 3,4-15,15'-bisdehydro-$\beta$-carotene in 60 ml. of toluene was shaken at a hydrogen atmosphere, at 20° C., in the presence of 2 g. of palladium-lead-calcium carbonate catalyst [Lindlar, Helvetica Chimica Acta, 35, 450 (1952)] and 0.2 mol of quinoline, until one mol of hydrogen was taken up. The catalyst was then filtered off and the solvent was evaporated in a high vacuum. The residue was crystallized from a mixture of methylene chloride and methanol, yielding 3,4-dehydro-15,15'-mono-cis-$\beta$-carotene as dark red to violet crystals, M. P. 137° C.; U. V. absorption maxima at 352 m$\mu$ ("cis peak") and 457 m$\mu$ (in petroleum ether solution).

*Example 8*

A suspension of 2 g. of 3,4-dehydro-15,15'-mono-cis-$\beta$-carotene in 10 ml. of petroleum ether (B. P. 80°–100° C.) was refluxed in a nitrogen atmosphere for 22 hours. The reaction mixture was cooled and the crystals were filtered off. Upon recrystallization from a mixture of methylene chloride and petroleum ether (alternatively, from a mixture of methylene chloride and methanol) of the solid so obtained, all-trans-3,4-dehydro-$\beta$-carotene was obtained as blue-violet crystals, M. P. 186° C.; absorption maximum in the ultraviolet spectrum at 461 m$\mu$ (in petroleum ether solution).

*Example 9*

100 g. of 8-(2,6,6-trimethyl-1-cyclohexen-1-yl)-2,6-dimethyl-2,4,6-octatrien-1-al was condensed with a lithium acetylide solution, prepared from 3 g. of lithium and acetylene in 1200 ml. of liquid ammonia, and worked up; according to the procedure in Example 5. There was obtained 108 g. of 10-(2,6,6-trimethyl-1-cyclohexen-1-yl)-4,8-dimethyl-4,6,8-decatrien-1-yn-3-ol, having an absorption maximum in the ultraviolet spectrum at 280 m$\mu$–281 m$\mu$ (in petroleum ether). The product was then condensed with a Grignard solution prepared from 18 g. of magnesium and 91 g. of ethyl bromide in 500 ml. of absolute diethyl ether; according to the procedure in Example 5. The resulting solution of the dimagnesium bromide derivative of 10-(2,6,6-trimethyl-1-cyclohexen-1-yl)-4,8-dimethyl-4,6,8-decatrien-1-yn-3-ol was condensed with 92 g. of 8-(2,6,6-trimethyl-1,3-cyclohexadien-1-yl)-2,6-dimethyl-2,4,6-octatrien-1-al; in the manner taught by Example 5 above. Upon working up in the manner taught by Example 5 above, 200 g. of resinous 1-(2,6,6-trimethyl-1,3 - cyclohexadien - 1 - yl) - 18 - (2,6,6 - trimethyl - 1-cyclohexen - 1 - yl) - 3,7,12,16 - tetramethyl - 8,11-dihydroxy-2,4,6,12,14,16-octadecahexaen-9-yne was obtained. The latter was worked up further according to the procedures of Examples 6, 7 and 8, thereby yielding all-trans-3,4-dehydro-$\beta$-carotene.

We claim:

1. A process which comprises condensing acetylene through one of its reactive hydrogen atoms with 8-(2,6,6-trimethyl - 1,3 - cyclohexadien - 1 - yl) - 2,6 - dimethyl-2,4,6-octatrien-1-al and through the other of its reactive hydrogen atoms with 8-(2,6,6-trimethyl-1-cyclohexen-1-yl)-2,6-dimethyl-2,4,6-octatrien-1-al by means of metal-organic reactions thereby producing 1-(2,6,6-trimethyl-1,3 - cyclohexadien - 1 - yl) - 18 - (2,6,6 - trimethyl - 1-cyclohexen - 1 - yl) - 3,7,12,16 - tetramethyl - 8,11 - dihydroxy-2,4,6,12,14,16-octadecahexaen-9-yne; subjecting the latter to bilateral allyl rearrangement-dehydration thereby producing 3,4-15,15'-bisdehydro-$\beta$-carotene; partially hydrogenating the latter at the triple bond thereby producing 3,4-dehydro-15,15'-mono-cis-$\beta$-carotene; and isomerizing the latter thereby producing all-trans-3,4-dehydro-$\beta$-carotene.

2. 1 - (2,6,6 - trimethyl - 1,3 - cyclohexadien - 1 - yl)-18 - (2,6,6 - trimethyl - 1 - cyclohexen - 1 - yl) - 3,7,12,16-tetramethyl - 8,11 - dihydroxy - 2,4,6,12,14,16 - octadecahexaen-9-yne.

3. 3,4-15,15'-bisdehydro-$\beta$-carotene.

4. 3,4-dehydro-15,15'-mono-cis-$\beta$-carotene.

5. A process which comprises condensing acetylene with 8 - (2,6,6 - trimethyl - 1,3 - cyclohexadien - 1 - yl)-2,6-dimethyl-2,4,6,-octatrien-1-al by means of a metal-organic reaction thereby producing 10-(2,6,6-trimethyl-1,3 - cyclohexadien - 1 - yl) - 4,8 - dimethyl - 4,6,8-decatrien-1-yn-3-ol; condensing the latter with 8-(2,6,6-trimethyl - 1 - cyclohexen - 1 - yl) - 2,6 - dimethyl-2,4,6-octatrien - 1 - al thereby producing 1-2,6,6-trimethyl-1,3-cyclohexadien - 1 - yl) - 18 - (2,6,6 - trimethyl - 1 - cyclohexen - 1 - yl) - 3,7,12,16 - tetramethyl - 8,11 - dihydroxy-2,4,6,12,14,16-octadecahexaen-9-yne; subjecting the latter to bilateral allyl rearrangement-dehydration thereby producing 3,4-15,15'-bisdehydro-$\beta$-carotene; partially hydrogenating the latter at the triple bond thereby producing 3,4-dehydro-15,15'-mono-cis-$\beta$-carotene; and isomerizing the latter thereby producing all-trans-3,4-dehydro-$\beta$-carotene.

6. 10 - (2,6,6 - trimethyl - 1,3 - cyclohexadien - 1 - yl)-4,8-dimethyl-4,6,8-decatrien-1-yn-3-ol.

7. A process of making all-trans-3,4-dehydro-$\beta$-carotene which comprises isomerizing 3,4-dehydro-15,15'-mono-cis-$\beta$-carotene.

8. A process which comprises condensing 10-(2,6,6-trimethyl - 1,3 - cyclohexadien - 1 - yl) - 4,8 - dimethyl-4,6,8 - decatrien-1-yn-3-ol with approximately one molar proportion of 8-(2,6,6-trimethyl-1-cyclohexen-1-yl)-2,6-dimethyl-2,4,6-octatrien-1-al thereby forming 1-(2,6,6-trimethyl-1,3-cyclohexadien-1-yl)-18-(2,6,6-trimethyl-1-cyclohexen-1-yl)-3,7,12,16-tetramethyl-8,11-dihydroxy-2,4,6,12,14,16-octadecahexaen-9-yne; reacting the latter with hydrogen halide selected from the group consisting of hydrogen chloride and hydrogen bromide, thereby forming the corresponding 1-2,6,6-trimethyl-1,3-cyclohexadien-1-yl)-18-2,6,6-trimethyl-1-cyclohexen-1-yl)-3,7,12,16-tetramethyl-2,17-dihalo-3,5,7,11,13,15-octadecahexaen-9-yne, and dehydrohalogenating the latter, thereby forming 3,4-15,15'-bisdehydro-β-carotene; partially hydrogenating the latter at the triple bond thereby forming 3,4-dehydro-15,15'-mono-cis-β-carotene; and isomerizing the latter thereby forming all-trans-3,4-dehydro-β-carotene.

9. A process which comprises condensing 10-(2-6,6-trimethyl-1-cyclohexen-1-yl)-4,8-dimethyl-4,6,8-decatrien-1-yn-3-ol with approximately one molar proportion of 8-(2,6,6-trimethyl-1,3-cyclohexadien-1-yl)-2,6-dimethyl-2,4,6-octatrien-1-al thereby forming 1-2,6,6-trimethyl-1,3-cyclohexadien-1-yl)-18-(2,6,6-trimethyl-1-cyclohexen-1-yl)-3,7,12,16-tetramethyl-8,11-dihydroxy-2,4,6,12,14,16-octadecahexaen-9-yne; reacting the latter with hydrogen halide selected from the group consisting of hydrogen chloride and hydrogen bromide, thereby forming the corresponding 1-(2,6,6-trimethyl-1,3-cyclohexadien-1-yl)-18-(2,6,6-trimethyl-1-cyclohexen-1-yl)-3,7,12,16-tetramethyl-2,17-dihalo-3,5,7,11,13,15-octadecahexaen-9-yne, and dehydrohalogenating the latter, thereby forming 3,4-15,15'-bisdehydro-β-carotene; partially hydrogenating the latter at the triple bond thereby forming 3,4-dehydro-15,15'-mono-cis-β-carotene; and isomerizing the latter thereby forming all-trans-3,4-dehydro-β-carotene.

10. 1-(2,6,6-trimethyl-1,3-cyclohexadien-1-yl)-18-(2,6,6-trimethyl-1-cyclohexen-1-yl)-3,7,12,16-tetramethyl-2,17-dihalo-3,5,7,11,13,15-octadecahexaen-9-yne wherein "halo" is selected from the group consisting of chloro and bromo.

11. All-trans-3,4-dehydro-β-carotene.

References Cited in the file of this patent

UNITED STATES PATENTS 2,671,112    Inhoffen et al. _____ Mar. 2, 1954
2,806,885    Isler et al. _____ Sept. 17, 1957

OTHER REFERENCES

Zechmeister et al.: Jour. Amer. Chem. Soc., vol. 75 (1953), p. 4493.

Isler et al.: Helv. Chim. Acta, vol. 39 (1956), pp. 274–282.

UNITED STATES PATENT OFFICE
CERTIFICATE OF CORRECTION

Patent No. 2,849,495                                            August 26, 1958

Otto Isler et al.

It is hereby certified that error appears in the printed specification of the above numbered patent requiring correction and that the said Letters Patent should read as corrected below.

Column 4, line 29, for "3,5,7,9,13,15" read -- 3,5,7,11,13,15 --; line 41, for "acivity" read -- activity --; column 7, line 22, for "23 g." read -- 123 g. --; line 35, for "1,3-cyclohen" read -- 1-cyclohexen --; line 52, for "shaken at a" read -- shaken in a --; column 8, line 58, for "1-2,6,6" read -- 1-(2,6,6 --; column 9, line 9, for "1-2,6,6" read -- 1-(2,6,6 --; same line, for "18-" read -- 18-( --.

Signed and sealed this 11th day of November 1958.

(SEAL)
Attest:

KARL H. AXLINE                                                  ROBERT C. WATSON

Attesting Officer                                            Commissioner of Patents